# United States Patent [19]
Oyamada et al.

[11] 4,396,571
[45] Aug. 2, 1983

[54] METHOD OF PREPARING RESIN COATED FOUNDRY SAND USING UNSATURATED POLYESTER

[75] Inventors: Akira Oyamada, Yokosuka; Koue Ohkawa; Kazumi Tanaka, both of Yokohama; Isao Suyama, Hatano, all of Japan

[73] Assignees: Nissan Motor Company, Ltd., Yokohama; Mitsui Toatsu Chemicals, Inc., Tokyo, both of Japan

[21] Appl. No.: 329,507

[22] Filed: Dec. 10, 1981

[30] Foreign Application Priority Data

Jan. 8, 1981 [JP] Japan ..................................... 56-737

[51] Int. Cl.$^3$ ............................................. C08L 67/06
[52] U.S. Cl. .................................... 264/219; 264/236; 264/221; 264/407; 264/148; 264/521
[58] Field of Search ................ 523/148, 521; 427/221; 428/407; 264/236, 219

[56] References Cited
U.S. PATENT DOCUMENTS 3,179,990 4/1965 Preeman .............................. 523/521
4,246,165 1/1981 Fujii et al. ............................ 526/148

FOREIGN PATENT DOCUMENTS 1960743 6/1971 Fed. Rep. of Germany .
2248692 4/1973 Fed. Rep. of Germany .
2429565 1/1975 Fed. Rep. of Germany .

Primary Examiner—Lewis T. Jacobs
Attorney, Agent, or Firm—Schwartz, Jeffery, Schwaab, Mack, Blumenthal & Koch

[57] ABSTRACT

In preparing a resin coated sand for use in sand mold casting processes by a hot-melt process using an unsaturated polyester which is solid at room temperature as the coating material, a solution of an organic peroxide as a polymerization initiator for the unsaturated polyester is introduced into the mixture of heated foundary sand and the unsaturated polyester while the polyester is in the state of liquid coating on the sand particles, and stirring is continued to uniformly mix the solution with the unsaturated polyester and evaporate and dissipate the solvent before solidification of the polyester coating as the result of cooling of the mixture. The polyester coating contains no liquid cross-linking agent, so that the resin coated sand is untacky and high in fluidity at room temperature and, therefore, can be filled into a die cavity to shape a sand mold or core with sufficiently high bulk density.

16 Claims, 2 Drawing Figures

METHOD OF PREPARING RESIN COATED FOUNDRY SAND USING UNSATURATED POLYESTER

BACKGROUND OF THE INVENTION

This invention relates to a method of preparing a resin coated foundry sand for forming molds and cores for use in a sand mold casting process by using an unsaturated polyester as the coating material.

In conventional sand mold casting processes, molds and cores are usually formed of a resin coated sand prepared by using a phenolic resin. The advantages of using a phenolic resin for this purpose reside in that the molds and cores after curing of the coated resin by a baking procedure are high in physical strength and accordingly convenient for handling and that the baking procedure can be completed in a short time owing to high rate of curing of this resin. In practice, however, the use of a phenolic resin has offered some problems to sand mold processes. First, ammonia gas is liberated during the baking procedure to form the molds and cores as an obstruction to the environmental hygiene because of partial decomposition of hexamethylenetetramine used as a cross-linking agent for the phenolic resin. Second, in aluminum alloy casting processes that are characterized by very low pouring temperatures compared with iron casting processes, the molds and cores remain in a very strong and tough state even at the shake-out stage after solidification of the poured molten metal mainly because of partial carbonization of the phenolic resin, so that the shake-out operation encounters difficulty. Particularly, disintegration of the sand cores needs to be preceded by a firing process in which the mold assemblies containing aluminum alloy casting and sand cores are heated at about 500° C. to thereby decompose the carbonized phenolic resin.

In view of such problems inherent to phenolic resin coated foundry sand, U.S. Pat. No. 4,246,165 proposes to use a binder composition of which principal component is an unsaturated polyester instead of phenolic resin. The proposed resin coated sand does not give out an irritating odor when baked to form molds and cores, and, as a more important advantage, not only molds but also cores formed of this resin coated sand and used in an aluminum alloy casting process can easily be disintegrated at the shake-out stage.

U.S. Pat. No. 4,246,165 specifies to use an unsaturated polyester that is a scarcely tacky solid at room temperature with a view to affording the resin coated sand with good fluidity at room temperature. Actually, however, a resin coated sand according to this U.S. patent is not fully satisfactory in its fluidity and exhibits some tackiness even at room temperature because the polyester coating on the sand particles contains a cross-linking agent, such as diallyl phthalate, which is liquid at room temperature. Particularly in the case of forming a sand mold or core having a thin-wall portion, the insufficiency in the fluidity of this resin coated sand becomes a matter for serious consideration because filling of a die cavity to shape the mold or core is liable to remain incomplete or insufficient in a narrow section where the thin-wall portion of the mold or core is shaped.

SUMMARY OF THE INVENTION

It is an object of the present invention to provide an improved method of preparing a resin coated sand for forming molds and cores for use in sand mold casting processes including aluminum alloy casting processes, which method utilizes an unsaturated polyester as the coating material and gives a resin coated sand which possesses advantages inherent to the unsaturated polyester and has good fluidity at room temperature.

To achieve this object the present invention provides a method of preparing a resin coated sand, which method comprises the steps of mixing a major amount of a heated foundry sand and a minor amount of an unsaturated polyester which is solid at room temperature such that the unsaturated polyester liquefies and adheres to the particles of the sand, adding a solution of a polymerization initiator for the unsaturated polyester in an organic solvent, which is selected such that the solvent and the unsaturated polyester have no mutual solubility, to the mixture of the sand and the unsaturated polyester while the temperature of the mixture is such that the unsaturated polyester remains in liquid state but hardly cures even in the presence of the polymerization initiator, stirring the resultant mixture thereby mixing the solution with the unsaturated polyester and causing the organic solvent to evaporate, and lowering the temperature of the mixture with continued stirring until solidification of the unsaturated polyester adhering to the sand particles.

The fundamental concept of the present invention is to uniformly mix a polymerization initiator, which is an organic peroxide, with the unsaturated polyester in the state of liquid coating on the sand particles without adding a conventionally used cross-linking agent. To achieve uniform mixing the polymerization initiator is introduced into the sand-polyester mixture as a solution in an organic solvent, but the solvent is completely evaporated and dissipated during subsequent stirring of the mixture in a still hot state. Therefore, the resin coated sand obtained by this method contains no liquid compound and accordingly does not exhibit tackiness and does exhibit good fluidity at room temperature. To ensure that the organic solvent does not remain in the solidified unsaturated polyester, the solvent is selected such that there is no mutual solubility between the solvent and the unsaturated polyester. As will be understood, it is desirable to select a solvent having a relatively low boiling point, such as ethanol for instance.

Although no cross-linking agent is admixed with the unsaturated polyester, the polyester coating on the sand particles undergoes curing when sufficiently heated at the baking stage for forming a sand mold or core because self-bridging of the ethylenic double bonds in the unsaturated polyester takes place by the action of the admixed polymerization initiator.

A resin coated sand prepared by the method of the invention possesses all the advantages of an unsaturated polyester as the coating material in place of phenolic resin. That is, the resin coated sand does not emit an offensive odor when baked to form molds or cores, and the molds and cores formed of this resin coated sand are sufficiently high in their initial strength but, nevertheless, can readily be disintegrated after solidification of the poured molten metal even in the cases of coating aluminum alloys.

Moreover, the improvement according to the invention brings about the following important advantages.

Firstly, a resin coated sand obtained by the method of the invention is untacky and exhibits good fluidity at room temperature, and accordingly this coated sand exhibits remarkably higher bulk density values than a resembling resin coated sand containing a liquid crosslinking agent in the polyester coating. Therefore, this resin coated sand can be filled into a die cavity for shaping a sand mold or core with a remarkably enhanced packing density, whereby it becomes possible to form the mold or core with improved precision even when the mold or core has a thin-wall portion, and consequentially it becomes possible to obtain castings of improved precision without suffering from casting defects such as metal penetration.

As an additional effect of the absence of cross-linking agent in the resin coated sand or, in other words, a decrease in the proportion of organic matter to sand, there occurs a considerable decrease in the quantity of gases the sand molds and cores liberate during a casting process to result in a decrease in casting defects attributed to the gases, such as blow holes. This effect is particularly appreciable in the cases of sand cores.

Besides, the resin coated sand can be prepared at reduced cost because an organic solvent employed by the invention is far cheaper than a cross-linking agent such as diallyl phthalate.

DESCRIPTION OF THE PREFERRED EMBODIMENTS

Figure 1:
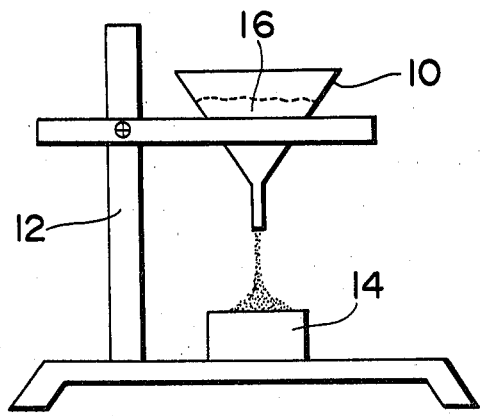
FIG. 1 is a schematic elevational view of an experimental apparatus for measurement of bulk density of a resin coated sand.

An unsaturated polyester for use in the present invention is obtained by esterification reaction or ester interchange reaction between a polybasic carboxylic acid having at least one ethylenic double bond, or its anhydride, and a polyhydric alcohol. The reactants are mixed and heated usually to a temperature in the range from 150° to 250° C. and maintained at this temperature to undergo esterification or ester interchange reaction, while water and/or alcohol formed by the reaction is continuously discharged from the reaction system.

Examples of suitable polybasic carboxylic acids and their anhydrdes are maleic acid, maleic acid anhydride, fumaric acid, itaconic acid, citraconic acid and mesaconic acid. Two or more of these compounds may be used jointly. To improve high temperature characterisitics of the unsaturated polyester and particularly to enhance the high temperature strength of the polyester in cured state, a portion of the polybasic carboxylic acid having at least one ethylenic double bond or its anhydride may be replaced by either a polybasic carboxylic acid having no ethylenic double bond, or its anhydride or alkyl ester, or a monocarboxylic acid. Suitable examples of such polybasic acids and their anhydrides and alkyl esters are terephthalic acid, isophthalic acid, phthalic acid, phthalic acid anhydride, dimethyl terephthalate, hymic acid anhydride, tetrahydrophthalic acid anhydride, methyltetrahydrophthalic acid anhydride, hexahydrophthalic acid anhydride, succinic acid, adipic acid, trimellitic acid anhydride, pyromellitic acid anhydride, tris-carboxyethyl isocyanurate and butanetetracarboxylic acid. Suitable examples of the aforementioned monocarboxylic acids are benzoic acid, abietic acid and fatty acids.

Examples of suitable polyhydric alcohols are ethylene glycol, propylene glycol, diethylene glycol, dipropylene glycol, 1,4-butanediol, 1,6-hexanediol, neopentyl glycol, trimethylpentanediol, hydrogenated bisphenol A, dimethylol cyclohexane, poly-$\epsilon$-caprolactone, metaxylene diglycol, trimethylolethane, trimethylolpropane, glycerin, pentaerythritol and tris-hydroxyethyl isocyanurate. Two or more of these compounds may be used jointly.

In the method according to the invention, curing of the unsaturated polyester coated on the sand particles is achieved by self-bridging of the unsaturated polyester upon sufficient heating of the resin coated sand. Therefore, the unsaturated polyester is required to have adequate numbers of ethylenic double bonds. It is preferred to use an unsaturated polyester having at least three ethylenic double bonds per 1000 g of the unsaturated polyester, because when the ethylenic double bonds are less than three per 1000 g sand molds or cores formed of a resin coated sand prepared by the method of the invention tend to become insufficient in their mechanical strength.

Unsaturated polyesters prepared from selective combinations of the above described reactants will differ from one another in the degree of sterical symmetry, and accordingly some of these unsaturated polyesters will be crystalline and the others amorphous. In the present invention, both crystalline unsaturated polyesters and amorphous unsaturated polyesters are of use, but it is essential to use an unsaturated polyester which is an untacky solid at room temperature. Where this requirement is met, the unsaturated polyester can be divided or crushed into fragments or grains which are individually smaller than about 5 mm in the maximal dimension with no difficulty. On the other hand, the unsaturated polyester should melt or liquefy at an adequate temperature and exhibit a sufficiently low viscosity in a temperature range convenient for preparation of a resin coated sand. It is preferred that the melting or softening temperature of the unsaturated polyester is in the range from about 60° C. to about 150° C. and that the viscosity of the unsaturated polyester at a temperature about 30° C. above its softening temperature is below about 500 poises, and more preferably below about 250 poises.

In the method of the invention, a catalyst or polymerization initiator for the unsaturated polyester is introduced into the mixture of foundry sand and the unsaturated polyester, preferably after the heated sand particles are coated with the liquefied unsaturated polyester but before re-solification of the unsaturated polyester on the sand particles surfaces. The polymerization initiator is selected from organic peroxides known as polymerization catalysts for unsaturated polyesters. Examples of suitable organic peroxides are benzoyl peroxide, lauroyl peroxide, di-tert-butyl peroxyadipate, dicumyl peroxide, methyl ethyl ketone peroxide, tert-butyl peroxybenzoate, cumene hydroperoxide, acetyl peroxide and tert-butyl hydroperoxide. Depending on the expected baking conditions for forming sand molds or cores, two or more of these peroxides may be used jointly. Usually 0.1 to 10 parts by weight of the polymerization initiator (in total where two or more kinds of peroxides are used) is used per 100 parts by weight of the unsaturated polyester.

If the polymerization initiator is introduced independently or singularly into the mixture of foundry sand and the unsaturated polyester in a sand mixer, uniform distribution of the polymerization initiator in the unsaturated polyester can hardly be expected and, hence, molds or cores formed of the resultant coated sand suffer from insufficient mechanical strength. In the present invention the polymerization initiator is used in the form of a solution in an organic solvent. This can be regarded as a great increase in the apparent volume of the polymerization initiator and therefore is quite effective for uniform mixing of this agent with the unsaturated polyester in the sand-polyester mixture.

To avoid rendering the resin coated sand wettish or tacky at room temperature, it is required to select an organic solvent for the polymerization initiator such that there is practically no mutual solubility between the selected organic solvent and the unsaturated polyester. An organic solvent and an unsaturated polyester can be judged to have practically no mutual solubility when a process of heating a mixture of equal parts by weight of the organic solvent and the unsaturated polyester in a glass vessel to a temperature above the softening temperature of the unsaturated polyester and well stirring the mixture and then cooling the mixture to room temperature results in either separation of the unsaturated polyester from the solvent or appearance of a cloudy and milk-white suspension.

Even in the absence of mutual solubility between the unsaturated polyester and the organic solvent for the polymerization initiator, it is undesirable that the organic solvent remains in the resin coated sand because it will render the coated sand somewhat tacky at room temperature. Accordingly, the organic solvent is required to have a relatively low boiling point so that the solvent may completely be evaporated and dissipated during preparation of the resin coated sand. As will be understood, coating of the sand particles with the unsaturated polyester must be accomplished with a limitation on the heating temperature so as not to cause curing reaction of the polyester. From this point of view, it is desirable to add a polymerization initiator solution to the sand-polyester mixture at a stage where the sand temperature is below a temperature at which the half-life of the polymerization initiator coexisting with the unsaturated polyester is one minute and perform a subsequent mixing procedure without raising the sand temperature beyond that temperature. Therefore, it is desirable to use an organic solvent of which boiling point is below the temperature at which the half-life of the polymerization initiator is one minute. In view of the organic peroxides suitable as the polymerization initiator in the present invention, it is most preferable to use an organic solvent of which boiling point is not higher than 120° C.

In the case of using a crystalline unsaturated polyester, the organic solvent for the polymerization initiator can be selected from a wide variety of organic liquid compounds including aliphatic hydrocarbons, aromatic hydrocarbons, alicyclic hydrocarbons, alcohols, esters, ethers, glycol ethers, ketones and carbon chlorides. It is possible to use a mixture of two or more kinds of such compounds. In the case of using an amorphous unsaturated polyester, some of the above listed compounds become unsuitable as the solvent for the polymerization initiator. In this case a suitable solvent can be selected from aliphatic hydrocarbons, aromatic hydrocarbons, alicyclic hydrocarbons, alcohols and carbon chlorides, and it is possible to use two or more compounds jointly. Since the solvent is to be evaporated and dissipated during preparation of the resin coated sand, selection of the solvent would be made also with consideration of the influence of the vapor of the solvent on the environment and the cost of the solvent. Usually, the use of ethyl alcohol as the organic solvent in the method of the invention is quite favorable in all respects.

As to the quantity of the organic solvent to dissolve the polymerization initiator, it is preferable to use 20 to 40 parts by weight of organic solvent per 100 parts by weight of the unsaturated polyester. When either a smaller amount of or a larger amount of organic solvent is used, molds or cores formed of the resultant coated sand become somewhat lower in their mechanical strength. This tendency can be explained by presuming that the use of only a very small amount of organic solvent will result in some nonuniformity in the distribution of the polymerization initiator in the unsaturated polyester and that the use of an excessively large amount of organic solvent makes it necessary to prolong the mixing operation to thereby completely evaporate and dissipate the solvent with an increased possibility of peeling of the polyester coating from the sand particles.

In a preferred mode, the preparation of a resin coated sand by hot-melt process according to the invention is accomplished by the steps of first preheating a silica sand useful as foundry sand to a temperature sufficiently above the softening temperature of the unsaturated polyester selected for this process, e.g. to 150°-200° C., then charging the preheated sand into a conventional sand mixer with the stirrer in operation and soon charging the unsaturated polyester in the form of small solid pieces into the mixer, continuing stirring to result in that the unsaturated polyester is liquefied by the heat of the sand and that the sand particles are coated with the liquefied polyester, then pouring a solution of a selected polymerization initiator into the mixer and further continuing stirring until the sand temperature becomes far below the softening temperature of the unsaturated polyester with the result that the polyester-coated sand particles separate from one another. Optionally a small amount of wax or lubricant such as calcium stearate may be added to the sand-polyester mixture after the addition of the polymerization initiator solution with the purpose of augmenting the fluidity of the resin coated sand and preventing agglomeration of the coated sand particles. The weight ratio of the unsaturated polyester to the foundry sand is usually in the range from 1:100 to 7:100.

By using a resin coated sand prepared by the method of the invention, molds and cores for sand mold casting can be formed by a conventional method. For example, the coated sand is blown into a metal die assembly preheated to a temperature of 150°-250° C. and then baked at 200°-250° C. for 0.5 to 5 minutes.

The invention will be illustrated by the following examples.

EXAMPLES 1A-1F

In a reaction vessel provided with a stirrer, thermometer and a condenser for water distilled out, an unsaturated polyester having an acid value of 25 was prepared by a usual esterifying condensation reaction process. The reactants were 1126 g of fumaric acid, 44 g of phthalic acid anhydride, 617 g of ethylene glycol and 56 g of diethylene glycol.

The unsaturated polyester as the reaction product was let cool down to room temperature, and at an intermediate stage where the temperature was 130° C. about 300 g of the unsaturated polyester was sampled into a beaker. After 25 hr, the unsaturated polyester (excluding the sampled portion) was in an untacky solid state.

By means of a jaw crasher, the solidified unsaturated polyester was broken into fine pieces that passed through a 9-mesh sieve (1.92 mm openings). The entire quantity of the crushed and sieved unsaturated polyester was divided into ten equal parts for use in Examples 1A to 1F and References 1(A) to 1(D) (described later), respectively.

The sampled portion (about 300 g) of the unsaturated polyester in the beaker was maintained at a temperature of 130° C. by using an oil bath, and the viscosity of this unsaturated polyester at this temperature was measured to be 58 poises by a Brookfield L-type rotation viscometer. Thereafter the sample was left standing at room temperature with a thermometer inserted therein to undergo natural cooling. At 103° C. the sample began to solidify to turn into an opaque solid which was confirmed to be a crystalline unsaturated polyester.

Throughout Examples 1A to 1F, benzoyl peroxide and dicumyl peroxide were jointly used as the polymerization initiator for the unsaturated polyester prepared in this manner, and ethyl alcohol was used as the solvent for the polymerization initiator. Invariably, 3 parts by weight of the polymerization initiator was used for 100 parts by weight of the unsaturated polyester in producing batches of resin coated sand in these examples, but the quantity of the solvent was varied within the range from 10 to 60 parts by weight.

In Example 1A, 1.5 g of benzoyl peroxide and 1.5 g of dicumyl peroxide were dissolved in 10 g of ethanol to obtain 13 g of solution.

To prepare a resin coated sand by a hot-melt process, 4 kg of a commercially available silica sand for foundry use was preheated to 180° C. and charged into a mixer. While continuing stirring of the sand, 100 g of the above described unsaturated polyester in the form of fine grains was added to the sand in the mixer when the sand temperature was 160° C., and stirring was further continued to result in that the unsaturated polyester was melted by the heat of the sand and that the sand particles were coated with the liquefied polyester. Then, 13 g of the aforementioned ethanol solution of the polymerization initiator was poured into the mixer, followed by further stirring of the mixture in the mixer to allow gradual lowering of the sand temperature. At a stage where blocking of the sand particles began (that is, adhesion of the sand particles to one another to form lumps by reason of solidification of the unsaturated polyester on the surfaces of the sand particles), 4 g of calcium stearate was added to the resin coated sand in the mixer, and stirring was further continued until the resin coated sand became so loose and fluidic that the individual sand particles were almost completely separated from one another.

In Examples 1B, 1C, 1D, 1E and 1F, the hot-melt process of Example 1A was similarly repeated except that the quantity of ethanol used to dissolve the polymerization initiator (1.5 g of benzoyl peroxide and 1.5 g of dicumyl peroxide) was varied to 20 g, 30 g, 40 g, 50 g and 60 g, respectively.

Each of the six batches of resin coated sand prepared in Examples 1A to 1F was subjected to measurement of bulk density as an indication of packing density of the sand in producing sand molds or cores, and test pieces formed of each resin coated sand were subjected to a high temperature tensile strength test.

Referring to FIG. 1, a conical funnel 10 held on a stand 12 was used to let 300 g of resin coated sand 16 make a free fall into a measuring vessel 14, which was placed at a determined vertical distance from the funnel 10 and had a known capacity that was insufficient to receive 300 g of the sand 16. Therefore, a portion of the fallen sand made a heap on the upper end of the vessel 14. The heaped portion of the sand was gently scraped away, and the sand filled in the vessel 14 was weighed accurately.

The high temperature tensile strength test was carried out by using a high temperature tensile tester for shell-type casting sand. Each test piece for this test was formed in a set of upper and lower metal dies provided with heaters by filling the cavity in the die set (the cavity had a horizontal sectional shape like a dumb-bell and a small depth relative to its horizontal sectional-area) with a resin coated sand to be tested and baking the sand in the die cavity at 230° C. for 70 sec. The test piece was subjected to the test immediately after completion of baking. For each batch of resin coated sand, the tensile strength test was carried out on ten test pieces to represent the high temperature strength by the average value of the ten measurements.

The results of the bulk density and high temperature tensile strength tests are presented in the following Table 1.

REFERENCES 1(A)–1(D)

For comparison, four different batches of resin coated sand were prepared generally in accordance with Examples 1A to 1D, respectively, except that styrene monomer was used as the solvent for the polymerization initiator in place of ethanol used in Examples. As is known, styrene monomer has conventionally been used as a practical cross-linking agent for unsaturated polyesters.

In Reference 1(A), 1.5 g of benzoyl peroxide and 1.5 g of dicumyl peroxide were dissolved in 10 g of styrene monomer to obtain 13 g of solution. In preparing a resin coated sand by the same process as in Example 1A by using 4 kg of the silica sand and 100 g of the unsaturated polyester, this styrene solution was added to the sand-polyester mixture in the mixer instead of the ethanol solution in Example 1A.

In References 1(B), 1(C) and 1(D), the quantity of styrene monomer was varied to 20 g, 30 g and 40 g, respectively.

The above described measurement of bulk density and high temperature tensile strength test were made on these four batches of resin coated sand, too, and the results are contained in Table 1.

TABLE 1

| | Solvent | Bulk Density (g/100 ml) | High Temp. Strength (kgf/cm$^2$) |
| --- | --- | --- | --- |
| Ex. 1A | ethanol, 10 parts | 158.3 | 8.9 |
| Ex. 1B | ethanol, 20 parts | 158.5 | 10.2 |
| Ex. 1C | ethanol, 30 parts | 159.0 | 10.2 |
| Ex. 1D | ethanol, 40 parts | 158.9 | 10.0 |
| Ex. 1E | ethanol, 50 parts | 158.5 | 9.5 |
| Ex. 1F | ethanol, 60 parts | 158.4 | 9.1 |
| Ref. 1(A) | styrene, 10 parts | 142.5 | 8.6 |
| Ref. 1(B) | styrene, 20 parts | 140.6 | 9.8 |
| Ref. 1(C) | styrene, 30 parts | 139.0 | 10.0 |
| Ref. 1(D) | styrene, 40 parts | 137.1 | 9.1 |

As can be seen in Table 1, the resin coated sands prepared in Examples 1A to 1F exhibited distinctly higher bulk density values than the resin coated sands of References 1(A) to 1(D). The reason is presumed to be as follows. In every Example, ethanol used as the solvent for the polymerization initiator must have completely evaporated out during preparation of the resin coated sand without reacting with the unsaturated polyester and without remaining in the unsaturated polyester in the resin coated sand. Consequentially the unsaturated polyester coating on the sand particles was untacky at room temperature, and therefore the resin coated sand exhibited good fluidity and a high bulk density value. In contrast, styrene monomer used as the solvent in every Reference must have remained in the unsaturated polyester coating on the sand particles. Due to the presence of liquid styrene monomer, the unsaturated polyester coating was somewhat tacky even at room temperature, and therefore the resin coated sand was relatively low in fluidity and, hence, in bulk density.

On the other hand, there was no significant difference in the high temperature tensile strength between Examples and References. This may seem rather strange because the high temperature strength represents a synergistic effect of many factors including not only the high temperature strength of the resin itself and the proportion of the resin to the sand but also a total value of actually contacting surface areas between the resin coated sand particles, while lowness of bulk density means smallness of the total value of the actual contact areas. However, understanding will be obtained by considering that styrene acts as a cross-linking agent for the unsaturated polyester molecules and that, therefore, the addition of styrene results in a corresponding increase in the amount of the resin in the baked resin coated sand.

EXAMPLES 2A-2F

To prepare an unsaturated polyester, 835 g of fumaric acid, 300 g of isophthalic acid, 279 g of ethylene glycol, 274 g of propylene gylcol and 176 g of hydrogenated bisphenol A were charged in the reaction vessel mentioned in Example 1 and heated with stirring to gradually raise the temperature of the mixture up to 220° C. Thereafter the temperature was maintained at 220° C. for 6 hr to allow the reactants to undergo esterifying condensation reaction, while water formed by reaction was continuously discharged from the reaction system. Obtained as the result was an unsaturated polyester having an acid value of 27.

The unsaturated polyester as the reaction product was let cool down to room temperature. At an intermediate stage where the temperature was 130° C., about 300 g of the unsaturated polyester was sampled into a beaker and used for measurement of viscosity and solidifying temperature by the same methods as in Example 1. The unsaturated polyester prepared in this example exhibited a viscosity value of 150 poises at 130° C. and began to solidify at 105° C. to turn into a semitransparent solid which was confirmed to be an amorphous unsaturated polyester. The remaining major portion of the unsaturated polyester, which was in an untacky solid state at room temperature, was crushed by the same method as in Example 1 into fine pieces that passed through 9-mesh sieve. The entire quantity of the crushed and sieved unsaturated polyester was divided into ten equal parts for use in Examples 2A to 2F and Reference 2(A) to 2(D) (described later), respectively.

In Examples 2A to 2F, the polymerization initiator described in Example 1 was used without varying its composition and quantity, but methyl alcohol was used as the solvent for the polymerization initiator in place of ethyl alcohol in Example 1.

In Example 2A, 1.5 g of benzoyl peroxide and 1.5 g of dicumyl peroxide were dissolved in 10 g of methanol, and a resin coated sand was prepared by the hot-melt process described in Example 1A by using 4 kg of the silica sand mentioned in Example 1, 100 g of the unsaturated polyester prepared in this example, 13 g of the methanol solution of the polymerization initiator and 4 g of calcium stearate.

In Examples 2B, 2C, 2D, 2E and 2F, the hot-melt process of Example 2 A was similarly repeated except that the quantity of methanol used to dissolve the polymerization initiator was varied to 20 g, 30 g, 40 g, 50 g and 60 g, respectively.

REFERENCES 2(A)-2(D)

For comparison, four different batches of resin coated sand were prepared generally in accordance with Examples 2A to 2D, respectively, except that styrene monomer was used as the solvent for the polymerization initiator in place of methanol used in Examples 2A-2D. In Reference 2(A), a solution of 1.5 g of benzoyl peroxide and 1.5 g of dicumyl peroxide in 10 g of styrene monomer was added to the sand-polyester mixture instead of the methanol solution in Example 2A. In References 2(B), 2(C) and 2(D), the quantity of styrene monomer was varied to 20 g, 30 g and 40 g, respectively.

Table 2 shows the bulk density and high temperature tensile strength values obtained by testing the resin coated sands of Examples 2A-2F and References 2(A)-2(D) by the methods described in Example 1.

As can be seen in Table 2, the resin coated sands of Examples 2A to 2F were distinctly higher in bulk density than the resin coated sands of References 2(A) to 2(D). In this case, it is possible to say that the coated sands of Examples 2A to 2D were better than the coated sands of References 2(A) to 2(D) in high temperature strength, too.

TABLE 2

| | Solvent | Bulk Density (g/100 ml) | High Temp. Strength (kgf/cm$^2$) |
|---|---|---|---|
| Ex. 2A | methanol, 10 parts | 158.1 | 8.7 |
| Ex. 2B | methanol, 20 parts | 158.0 | 9.8 |
| Ex. 2C | methanol, 30 parts | 157.9 | 10.1 |
| Ex. 2D | methanol, 40 parts | 157.9 | 10.0 |
| Ex. 2E | methanol, 50 parts | 157.8 | 9.4 |
| Ex. 2F | methanol, 60 parts | 157.8 | 8.9 |
| Ref. 2(A) | styrene, 10 parts | 140.8 | 8.4 |
| Ref. 2(B) | styrene, 20 parts | 139.2 | 9.0 |
| Ref. 2(C) | styrene, 30 parts | 137.8 | 9.5 |
| Ref. 2(D) | styrene, 40 parts | 135.9 | 9.0 |

EXAMPLES 3A-3F

In the reaction vessel mentioned in Example 1, an unsaturated polyester having an acid value of 30 was prepared by causing 1137 g of fumaric acid, 29 g of adipic acid and 652 g of ethylene glycol to undergo esterifying condensation reaction. The unsaturated polyester as the reaction product was let cool down to room temperature. At an intermediate stage where the temperature was 130° C., a small portion of the unsaturated polyester was sampled into a beaker and used for measurement of viscosity and solidifying temperature by the same methods as in Example 1. The sampled portion of the unsaturated polyester exhibited a viscosity value of 48 poises at 130° C. and began to solidify at 102° C. to turn into a milk-white and opaque solid which was confirmed to be a crystalline unsaturated polyester. The remaining major portion of the unsaturated polyester, which was in an untacky solid state at room temperature, was crushed by the method described in Example 1 into fine pieces that passed through a 9-mesh sieve. The entire quantity of the crushed and sieved unsaturated polyester was divided into ten equal parts for use in Examples 3A to 3F and References 3(A) to 3(D) (described later), respectively.

In Examples 3A to 3F, dicumyl peroxide was used as the polymerization initiator for the above described unsaturated polyester and ethanol as the solvent for the polymerization initiator. Invariably, 2 parts by weight of the polymerization initiator was used for 100 parts by weight of the unsaturated polyester, but the quantity of the solvent was varied within the range from 10 to 60 parts by weight in preparing six different batches of resin coated sand in Examples 3A to 3F.

In Example 3A, 2.0 g of dicumyl peroxide was dissolved in 10 g of ethanol, and a resin coated sand was prepared by the hot-melt process described in Example 1A by using 4 kg of the silica sand mentioned in Example 1, 100 g of the unsaturated polyester prepared in this example, 12 g of the ethanol solution of dicumyl peroxide and 4 g of calcium stearate.

In Examples 3B, 3C, 3D, 3E and 3F, the hot-melt process of Example 3A was similarly repeated except that the quantity of ethanol used to dissolve 1.5 g of dicumyl peroxide was varied to 20 g, 30 g, 40 g, 50 g and 60 g, respectively.

REFERENCES 3(A)–3(D)

For comparison, four different batches of resin coated sand were prepared generally in accordance with Examples 3A to 3D, respectively, except that diallyl phthalate monomer was used as the solvent for the polymerization initiator in place of ethanol used in Examples 3A–3D. As is known, diallyl phthalate monomer serves as a cross-linking agent for unsaturated polyesters. In Reference 3(A), a solution of 2.0 g of dicumyl peroxide in 10 g of diallyl phthalate monomer was added to the sand-polyester mixture instead of the ethanol solution in Example 3A. In References 3B, 3C and 3D, the quantity of diallyl phthalate was varied to 20 g, 30 g and 40 g, respectively.

Table 3 shows the bulk density and high temperature tensile strength values obtained by testing the resin coated sands of Examples 3A–3F and References 3(A)–3(D) by the methods described in Example 1.

TABLE 3

| | Solvent | Bulk Density (g/100 ml) | High Temp. Strength (kgf/cm²) |
|---|---|---|---|
| Ex. 3A | ethanol, 10 parts | 158.6 | 9.3 |
| Ex. 3B | ethanol, 20 parts | 158.7 | 10.8 |
| Ex. 3C | ethanol, 30 parts | 159.0 | 10.9 |
| Ex. 3D | ethanol, 40 parts | 158.8 | 10.9 |
| Ex. 3E | ethanol, 50 parts | 158.7 | 10.2 |
| Ex. 3F | ethanol, 60 parts | 158.2 | 9.7 |
| Ref. 3(A) | DAP, 10 parts | 140.5 | 9.4 |
| Ref. 3(B) | DAP, 20 parts | 139.6 | 9.8 |
| Ref. 3(C) | DAP, 30 parts | 138.8 | 10.7 |
| Ref. 3(D) | DAP, 40 parts | 137.8 | 10.2 |

As can be seen in Table 3, the resin coated sands of Examples 3A to 3F exhibited distinctly higher bulk density values than the resin coated sands of References 3(A) to 3(D). From a comparison between Tables 2 and 3, it is understood that the resin coated sands of References 3(A) to 3(D) were better in high temperature strength than the resin coated sands of References 2(A) to 2(D), probably because diallyl phthalate monomer is superior in heat resistance to styrene monomer used in References 2(A)–2(D).

EXAMPLES 4A–4F

To prepare an unsaturated polyeter, 766 g of fumaric acid, 422 g of trimellitic acid anhydride, 409 g of ethylene glycol and 303 g of dimethylcyclohexane were charged in the reaction vessel mentioned in Example 1 and heated with stirring to gradually raise the temperature of the mixture up to 210° C. Thereafter the temperature of the reaction system was maintained at 210° C. for 5 hr to allow the reactants to undergo esterifying condensation reaction, while water formed by the reaction was continuously discharged from the reaction system. Obtained as the result was 1400 g of an unsaturated polyester having an acid value of 32. This unsaturated polyester exhibited a viscosity value of 125 poises at 130° C. and began to solidify at 110° C. to turn into a semitransparent solid, which was untacky at room temperature and confirmed to be an amorphous unsaturated polyester.

The unsaturated polyester prepared in this way was crushed and sieved in accordance with Example 1 and divided into ten equal parts for use in Examples 4A to 4F and References 4(A) to 4(D) (described later), respectively.

In Example 4A, 2.0 g of ducumyl peroxide used as the polymerization initiator was dissolved in 10 g of hexane, and a resin coated sand was prepared by the hot-melt process described in Example 1 by using 4 kg of the silica sand mentioned in Example 1, 100 g of the unsaturated polyester prepared in this example, 12 g of the hexane solution of dicumyl peroxide and 4 g of calcium stearate.

In Examples 4B, 4C, 4D, 4E and 4F, the hot-melt process of Example 4A was similarly repeated except that the quantity of hexane used to dissolve 2 g of dicumyl peroxide was varied to 20 g, 30 g, 40 g, 50 g andf 60 g, respectively.

REFERENCES 4(A)–4(D)

For comparison, four different batches of resin coated sand were prepared generally in accordance with Examples 4A to 4D, respectively, except that diallyl phthalate monomer was used as the solvent for the polymerization initiator in place of hexane used in Examples 4A–4D. In Reference 4(A), a solution of 2.0 g of dicumyl peroxide in 10 g of diallyl phthalate monomer was added to the sand-polyester mixture instead of the hexane solution in Example 4A. In References 4(B), 4(C) and 4(D), the quantity of diallyl phthalate monomer was varied to 20 g, 30 g and 40 g, respectively.

Table 4 shows the bulk density and high temperature tensile strength values obtained by testing the resin coated sands of Examples 4A–4F and References 4(A)–4(D) by the methods described in Example 1.

TABLE 4

| | Solvent | Bulk Density (g/100 ml) | High Temp. Strength (kgf/cm²) |
|---|---|---|---|
| Ex. 4A | hexane, 10 parts | 158.5 | 9.2 |
| Ex. 4B | hexane, 20 parts | 158.4 | 10.6 |

TABLE 4-continued

| | Solvent | Bulk Density (g/100 ml) | High Temp. Strength (kgf/cm$^2$) |
|---|---|---|---|
| Ex. 4C | hexane, 30 parts | 158.9 | 10.9 |
| Ex. 4D | hexane, 40 parts | 158.8 | 10.8 |
| Ex. 4E | hexane, 50 parts | 158.3 | 10.3 |
| Ex. 4F | hexane, 60 parts | 158.4 | 9.8 |
| Ref. 4(A) | DAP, 10 parts | 140.1 | 9.2 |
| Ref. 4(B) | DAP, 20 parts | 139.2 | 9.9 |
| Ref. 4(C) | DAP, 30 parts | 138.6 | 10.8 |
| Ref. 4(D) | DAP, 40 parts | 137.8 | 10.5 |

The bulk density data shown in Tables 1 to 4 suggest that a resin coated sand prepared by the method of the invention will exhibit a superior packing or filling tendency when used in forming practical sand molds and cores. To varify this expectancy, the resin coated sands of Examples 1C, 2C, 3C and 4C and References 1(A), 2(A), 3(A) and 4(A) were each used in forming an experimental core.

Figure 2:
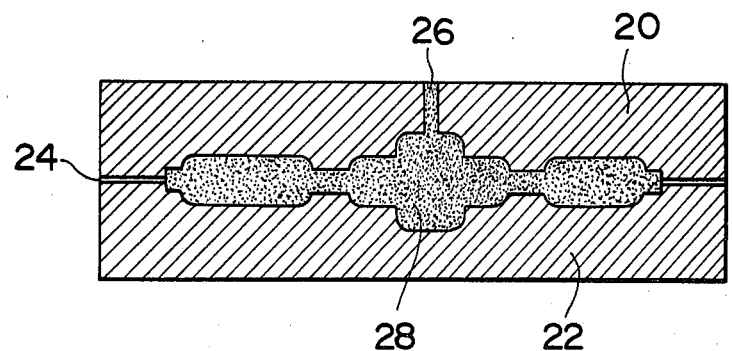
FIG. 2 is a cross-sectional view of a metal die assembly to form an experimental sand core.

FIG. 2 shows a set of metal dies used to form the experimental core. An upper metal die 20 and a lower metal die 22 were assembled as illustrated to leave a narrow air slit 24 between the opposite die faces of the two dies 20, 22 in their peripheral region. The die assembly was preheated to 230° C. and maintained at this temperature. A resin coated sand 28 for testing was blown into the die cavity through an inlet opening 26 formed in the upper metal die 20 at a blowing pressure of 4 kg/cm$^2$, and the die set was left standing for a period of 2 min to cause baking and resultant hardening of the resin coated sand 28 in the die cavity. The weight of the sand core formed in this manner was measured accurately to express the packing tendency of the tested resin coated sand by the measured weight. For each resin coated sand the experiment was repeated three times, and Table 5 shows the average value of the three measurements for each resin coated sand.

TABLE 5

| Coated Sand | Weight of Sand Core (g) | Coated Sand | Weight of Sand Core (g) |
|---|---|---|---|
| Ex. 1C | 125.6 | Ref. 1(A) | 111.8 |
| Ex. 2C | 125.0 | Ref. 2(A) | 110.9 |
| Ex. 3C | 125.2 | Ref. 3(A) | 111.6 |
| Ex. 4C | 125.3 | Ref. 4(A) | 111.1 |

The experimental data in Table 5 show that the resin coated sands of Examples are better in the packing tendency or packing density than the resin coated sands of References by about 11%. Besides, the experimental cores formed of the coated sands of Examples had very smooth surfaces. In contrast, the experimental cores formed of the coated sands of References had rough surfaces and gave an impression that the use of these sand cores might result in the occurrence of casting defects by reason of penetration of molten metal.

What is claimed is:

1. A method of preparing a resin coated sand for forming molds and cores for use in sand mold casting processes, the method comprising the steps of:
mixing a major amount of a heated foundry sand with a minor amount of an unsaturated polyester, which is solid at room temperature, such that said unsaturated polyester liquefies and adheres to the particles of said sand, said unsaturated polyester having at least three ethylene double bonds per 1000 g of said unsaturated polyester;
adding a solution of a polymerization initiator for said unsaturated polyester in an organic solvent, absent any cross-linking agent, to the mixture of said sand and said unsaturated polyester while the temperature of said mixture is such that said unsaturated polyester remains in liquid state but hardly cures even in the presence of said polymerization initiator, said organic solvent being selected such that said organic solvent and said unsaturated polyester have no mutual solubility;
stirring the resultant mixture thereby mixing said solution in the absence of a cross-linking agent, with said unsaturated polyester and causing said organic solvent to evaporate; and
lowering the temperature of said resultant mixture with continued stirring until solidification of said unsaturated polyester adhering to the particles of said sand.

2. A method according to claim 1, wherein said unsaturated polyester is an untacky solid at room temperature, the viscosity of said unsaturated polyester at a temperature about 30° C. above the softening temperature thereof being below about 500 poises.

3. A method according to claim 2, wherein said viscosity at said temperature is below about 250 poises.

4. A method according to claim 3, wherein said unsaturated polyester is the product of reaction between at least one polybasic carboxylic acid having at least one ethylenic double bond, or an anhydride thereof, and at least one polyhydric alcohol.

5. A method according to claim 3, wherein said unsaturated polyester is the product of reaction between at least one polyhydric alcohol and a mixture of at least one polybasic carboxylic acid having at least one ethylenic double bond, or an anhydride thereof, and at least one carboxylic acid having no ethylenic double bond, or an anhydride or alkyl ester thereof.

6. A method according to claim 1, wherein said polymerization initiator is at least one organic peroxide.

7. A method according to claim 6, wherein said at least one organic peroxide is selected from the group consisting of benzoyl peroxide, lauroyl peroxide, di-tert-butyl peroxyadipate, dicumyl peroxide, methylethyl ketone peroxide, tert-butyl peroxybenzoate, cumene hydroperoxide, acetyl peroxide and tert-butyl hydroperoxide.

8. A method according to claim 7, wherein the weight ratio of said polymerization initiator dissolved in said solution to said unsaturated polyester is in the range from 0.1:100 to 10:100.

9. A method according to claim 6, wherein said unsaturated polyester is a crystalline unsaturated polyester, said organic solvent being selected from the group consisting of aliphatic hydrocarbons, aromatic hydrocarbons, alicyclic hydrocarbons, alcohols, esters, ethers, glycol ethers, ketones and carbon chlorides.

10. A method according to claim 6, wherein said unsaturated polyester is an amorphous unsaturated polyester, said organic solvent being selected from the group consisting of aliphatic hydrocarbons, aromatic hydrocarbons, alicyclic hydrocarbons, alcohols and carbon chlorides.

11. A method according to claim 6, wherein the boiling point of said organic solvent is not higher than 120° C.

12. A method according to claim 8 or 11, wherein the weight ratio of said organic solvent in said solution to said unsaturated polyester is in the range from 20:100 to 40:100.

13. A method according to claim 1, wherein the weight ratio of said unsaturated polyester to said foundry sand is in the range from 1:100 to 7:100.

14. A method according to claim 1, wherein said method consists essentially of said steps.

15. A method according to claim 11, wherein said solvent is ethanol.

16. A method according to claim 1, further comprising the steps of:
introducing the resin coated sand into a die for shaping said coated sand into the shape of the mold; and
heating said resin coated sand in said die to cure said unsaturated polyester on said sand particles, said curing resulting solely by self-bridging of said ethylene double bonds by the action of the polymerization inhibitor.

* * * * *